United States Patent
Wygant

[15] 3,695,108
[45] Oct. 3, 1972

[54] ADAPTIVE PROPORTIONAL CONTROL FOR DETERMINING INTERFACES OF DISTINCT MATERIALS

[72] Inventor: Noel D. Wygant, Littleton, Colo. 80120

[73] Assignee: Marathon Oil Company, Findlay, Ohio

[22] Filed: July 23, 1970

[21] Appl. No.: 57,634

[52] U.S. Cl. ............... 73/290 R, 73/290 V, 73/292, 73/304 C, 73/304 R
[51] Int. Cl. .......................... G01f 23/22, G01f 23/26
[58] Field of Search ........ 73/290 R, 290 U, 292, 299, 73/301, 304 R, 304 C

[56] References Cited

UNITED STATES PATENTS

| | | | |
|---|---|---|---|
| 2,867,120 | 1/1959 | Schafer | 73/304 C |
| 3,003,355 | 8/1961 | Wright | 73/299 |
| 3,424,002 | 1/1969 | Johnson | 73/290 R |
| 3,111,031 | 11/1963 | Kuritza | 73/362 AR X |
| 2,797,284 | 6/1957 | Brooke | 73/304 R X |

*Primary Examiner*—Louis R. Prince
*Assistant Examiner*—Frederick Shoon
*Attorney*—Joseph C. Herring, Richard C. Willson, Jr. and Jack L. Hummel

[57] ABSTRACT

A process and apparatus for detecting changes in interface level between distinct materials within a container independent of any chemical or physical changes taking place within either or both of the distinct materials. Sensors are introduced into each of the materials and an additional sensor is placed across the interface, the output from each of the three sensors is transmitted to an adaptive detector device which combines these outputs by means of a control equation to give an emanating signal proportional solely to the position of the interface within the container.

17 Claims, 3 Drawing Figures

PATENTED OCT 3 1972 3,695,108
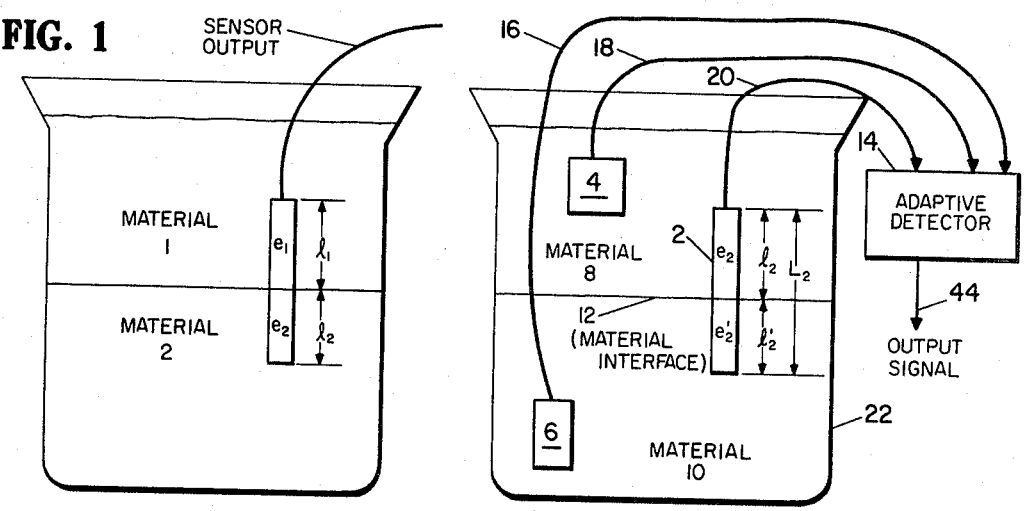
FIG. 1
FIG. 2
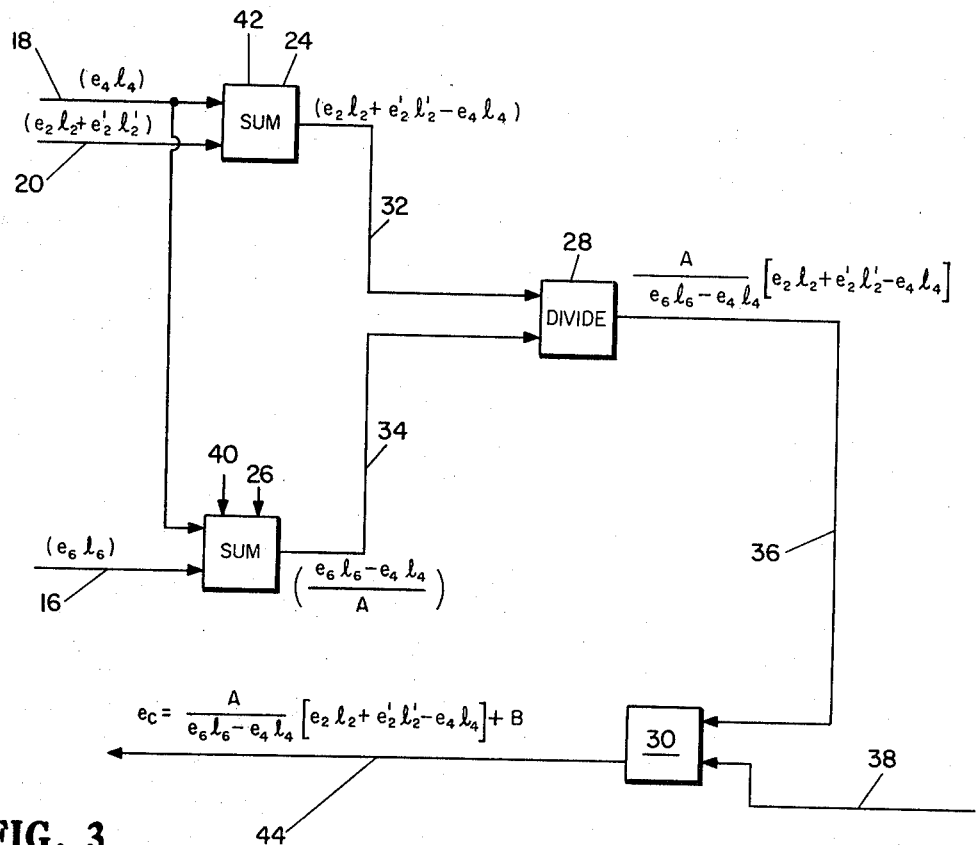
FIG. 3
INVENTOR
N. D. WYGANT
BY
*[signature]*
ATTORNEY

3,695,108

ADAPTIVE PROPORTIONAL CONTROL FOR DETERMINING INTERFACES OF DISTINCT MATERIALS

BACKGROUND OF THE INVENTION

1. Field of the Invention

This invention relates generally to the measurement of interfaces of materials in contact with each other and relates more particularly to a novel process and apparatus for measuring positional changes for the interface between the materials even when the characteristics of the individual materials are changing, i.e. the system adapts to the changing characteristics of the materials while providing a measurement which depends solely on the position of the interface.

2. Description of the Prior Art

Interface meters, detectors, transducers, and other systems have long been used extensively in various measuring, control and alarm systems. In simplified form, these devices give an output proportional to interface position. A simple example is a float gauge in an oil tank which gives an output indicating oil level. This output can be used for measuring, controlling and detecting the interface position within an enclosure such as a tank.

However, the inherent characteristics of the interface materials often undergo changes with time, temperature, pressure, as well as other environmental changes. When these phenomena occur, the devices often require recalibration or extensive modification for protection against the discrepancies which arise as a result of these changes. It is obvious that these devices have serious shortcomings, making them unsuitable or completely unsatisfactory for many applications.

The present invention is advantageous over the prior art in that it measures the interface position independent of chemical or physical characteristics of the materials. Furthermore, increased accuracy, greater reliability, and greater simplicity as well as increased sensitivity, resolution, and response are additional advantages.

SUMMARY OF THE INVENTION

This invention comprises introducing sensors into the materials and across the interface of the materials to measure characteristics of the materials and interface. The output from the sensors is transmitted to an adaptive detector which through electronic circuits or pneumatic means operates and adapts to provide an output signal which is responsive to a change in interface position between the materials being measured.

The system is not only useful for detection of interface changes, but it may also be readily adapted to an alarming system, e.g., an audio alarm, or the system can utilize the output signal from the adaptive detector to trigger a control mechanism for remedying any adverse change in interface position. For instance, a system can be adapted to withdraw or add one of the liquids in a settling tank in which a solvent extraction technique is being used to separate normally miscible fluids.

BRIEF DESCRIPTION OF THE DRAWINGS

The invention will be more clearly understood by reference to the accompanying drawings in which:

FIG. 1 shows a sensor bridging the interface between two unlike materials.

FIG. 2 depicts the three sensors immersed in two different materials. The sensors are connected to an adaptive detector.

FIG. 3 shows a block diagram of the adaptive detector operations used to assimilate the outputs from each of the sensors of FIG. 2 using the unique control of the present invention.

DESCRIPTION OF THE PREFERRED EMBODIMENTS

In FIG. 2, sensors 2, 4, and 6 are positioned in material 8, material 10 and across material interface 12, all disposed within container 22. Outputs from sensors 2, 4, and 6 are transmitted to adaptive detector 14 via suitable transmitting means 16, 18, and 20, respectively. Detector 14 adapts the signals from the sensors to give output signal 24 proportional only to the position of interface 12 in container 22.

Linear output characteristics describe the sensors utilized. Therefore, the sensors produce an output proportional to the property of the material (in which it is immersed) and the length of the sensor. The property of the material can be the dielectric constant, resistivity, temperature, velocity of sound, density, etc.

Examples of sensors for a given property are platinum thermometer for temperature, transmitter-receiver system for velocity of sound, and pressure transducer for density.

For a two material system, see FIG. 1, these properties can be described by the general equation:

$$e_0 = e_1 l_1 + e_2 l_2 e, \neq e_2 \qquad (1)$$

For our system, using materials 8 and 10 and sensor 2, see FIG. 2:

$$e_0 = e_2 \times l_2 + e'_2 \times l'_2, e_2 \neq e_2 \qquad (2)$$

where $e_0$ is the output of sensor 2

$e_2$ is the output per unit length of sensor 2 in material 8

$e'_2$ is the output per unit length of sensor 2 in material 10

$l_2$ is the length of sensor 2 in material 8

$l'_2$ is the length of sensor 2 in material 10

$L_2$ is the length of sensor 2

General equation 1 also extends to the output of sensors 4 and 6, where the output of sensor 4 is equal to $e_4 l_4$ and the output of sensor 6 is equal to $e_6 l_6$.

Many types of sensors or transducers are known to have the above linear output characteristics. The outputs can be voltage, current, pressure, etc. An example is a coaxial capacitance sensor. Other types of sensors having this linear relationship, which are obvious to those skilled in the art, are meant to be included within this invention. A preferred sensor utilizes a twin-lead probe transducer in combination with a time domain reflectomer, (TDR), e.g., Model No. 1415A, Hewlett Packard Company.

Time domain reflectometry *Time Domain Reflectomery, Application Note 62, Hewlett-Packard Co., 1964, 1501 Page Mill Road, Palo Alto, Calif., U. S. A. consists essentially of transmitting a very fast step function into a transmission system, e.g., sensors 2, 4, and 6 which are twin-lead probe transducers. The occurrence of an interface of two liquids will be treated by the Time Domain Reflectometer as a "discontinuity," explainable under Transmission Theory as an abrupt change in an otherwise constant impedance of the transmission system.

The output of the TDR is a signal directly proportional to the impedance. This signal is also directly proportional to the dielectric constant of the material the probe is disposed in and the length of the probe, i.e., the output follows the general equation $e_o = e_1 l_1 + e_2 l_2$.

The output signals from each of the three sensors are transmitted along lines 16, 18 and 20 and are received and assimilated by adaptive detector 14.

The container may be any suitable vessel capable of containing the materials. Input and output valves may be positioned advantageously to allow injection or withdrawal of additional materials. These valves may be automatically controlled to position desired interfaces. The materials themselves may be slightly miscible although preferably immiscible. Examples of materials which may form an interface include two liquid materials, e.g. oil and water, a gas and a liquid, e.g. water and steam in equilibrium, a solid and a liquid, e.g. a supersaturated brine solution, two solids, e.g. wheat and barley contained within an agricultural storage bin, etc. It should be understood that while the drawing depicts a two material interface system, the invention may be extended to include systems containing a plurality of materials, where interfaces exist between adjacent materials.

Referring to FIG. 3, while the summing and dividing networks shown in the Figure will be described in terms of electronic circuitry, where the inputs $e_{16}$ and $e_{18}$ represent voltages, the operations shown in this Figure may be accomplished by using current, pressure (hydraulic), pneumatic pressure, etc. as a means of arriving at the output $e_c$ emanating from summing network, also called a summing circuit 30. The design and use of electronic summing circuits is well known in the art, and this technology may be used in the present invention.

The negative of the output from sensor 4 arriving via conductor 18 is summed in summing circuit 24 with the output from sensor 2 measuring across the interface and fed to summing circuit 24 via line 20. Manual or automatic input 42 is fed to summing network 24 to scale $e_4 l_4 = e_2 l_2$ and $e_6 e_6 = e'_2 l'_2$ and insure that the inputs are within the limits of operation of the network. The output from summing circuit 24 is equivalent to $e_2 l_2 + e'_2 l'_2 - e_4 l_4$ and is transmitted via conductor 32 to dividing circuit 28. The output from conductor 18 is also transmitted to summing circuit 26 and its negative is summed with the output from sensor 6 transmitted via line 16. A span adjust coefficient equal to 1 over A via input 40 is applied to summing circuit 26 to give an output equivalent to $e_6 l_6 - e_4 l_4$ all divided by A which is transmitted via conductor 34 to dividing circuit 28. Any suitable DC voltage or DC current span may be used, such as a span of 5:1, e.g., 4—20 milliamperes, 1—5 volts DC, 10—50 milliamperes. In dividing circuit 28, the output from summing circuit 24 is divided by the output from summing circuit 26 which gives a resultant output of:

$$e_c = A/e_6 l_6 - e_4 l_4 \; [e_2 l_2 + e'_2 l'_2 - e_4 l_4]$$

This output is conveyed via conductor 36 to final summing circuit 30 where it is combined with offset term B conducted via 38 to give final output $e_c$:

$$e_c = A/e_6 l_6 - e_4 l_4 \; [e_2 l_2 + e'_2 l'_2 - e_4 l_4] + B$$

Offset term B represents the threshold value of the span, e.g., the span of 1—5 volts, $B = 1$ volt. Each of the adjusting input offset term $B$ via 38, span $A$ input 40, and scaling factor 42 may be manually or automatically provided in each of the summing circuits.

In the operation of the invention, briefly, each of the sensors are disposed in their respective materials and the interface sensor is disposed through the interface or juncture of the materials. The output of each of the three sensors is fed to adaptive detector 14. The output $e_c$ or 44 of adaptive detector 14 is a signal proportional to the interface position and is independent of material characteristics.

The control equation of FIG. 3 is:

$$e_c = A/e_6 l_6 - e_4 l_4 \; [e_2 l_2 + e'_2 l'_2 - e_4 l_4] + B$$

This novel control equation satisfies the conditions for the adaptive detector which is synthesized from this equation. It is obvious to those skilled in the art that the order of summing and dividing operations of FIG. 3 can be varied and a different sequencing of operations may be employed to come up with the same control equation.

The following exemplary embodiment demonstrates how the control equation output $e_c$ is independent of the individual outputs of the materials.

EXAMPLE 1

Basis: $l_2 = l'_2 = L_2 \; 2; \; l_4 = l_6 = L_2 = L$.

$e_6 = e'_2, \; e_4 = e_2$ (all sensors same material and length)

This is the case where the sensor for detecting the interface is one-half covered. Thus from the control equation, see FIG. 3, the following:

$$e_c = A/e_6 l_6 - e_4 l_4 \; [e_2 l_2 + e'_2 l'_2 - e_4 l_4] + B$$

then:

$$e_o = \frac{A}{L(e'_2 - e_2)} \left[ e_2 \frac{L}{2} + \frac{e'_2 L}{2} - e_2 L \right] + B$$

$$e_o = \frac{A}{e'_2 - e_2} \left[ \frac{e'_2 - e_2}{2} \right] + B$$

$$e_o = \frac{A}{2} + B$$

The output is thus one half of the span term, plus the offset term, and is independent of $e_1$ and $e_2$. Obviously, a detection in interface change will occur when the value of $e_c$ deviates from this value of $A/2 + B$.

EXAMPLE 2

In this case, $l'_2 = 0$ and $l_2 = L_2 = l_4 = l_6 = L$, that is, the sensor for detecting the interface is covered only in material 8. Also, $e_4 = e_2$. Then:

$$e_c = A/e_6 l - e_4 l \; [e_2 L - e_2 L] + B = B.$$

The output is again independent of the sensor output $e_2$ and $e_2$ per unit of length of sensor. In this case the sensor is covered only in material 8.

As actual examples, given A, a voltage span of 1—5 volts DC, case 1 will result in an output $e_c$ equal to 4 2 plus $l = 3$ volts which is midpoint between the span of 1—5 volts. In case 2, $e_c = B = l$ volt.

A reading of the foregoing application will make it obvious that there are certain modifications and variations of the invention and these are meant to be included within the reading of the specification and within the scope of the appended claims. All those skilled in the art will appreciate such variations and modifications.

What is claimed is:

1. A process for detecting change in position of an interface defined by two adjacent different materials in a container comprising:
   a. introducing a first sensor of a certain length into the first material, the sensor having an electrical output proportional to the sensed property of the material and the length of the sensor; the output is transmitted to an adaptive detector,
   b. introducing a second sensor of a certain length into the second material, the second sensor having an electrical output proportional to the sensed property of the material and the length of the sensor; the output is transmitted to the adaptive detector,
   c. introducing a third sensor of a certain length into the region of the interface so that portions of the third sensor are in each of the two materials, the electrical output of the third sensor is proportional to the product of the length of the third sensor in the first material and the sensed property of the first material in summation with the product of the length of the third sensor in the second material and the sensed property of the second material; the output of the third sensor is transmitted to the adaptive detector,
   d. combining each of the sensor outputs in the adaptive detector in accordance with the formula:

$$e_c = A \left( \frac{\text{output from the third sensor-output from the first sensor}}{\text{output from the second sensor-output from the first sensor}} \right)$$

wherein $e_c$ is the output of the adaptive detector and A is a constant proportional to the span of each sensor output.

2. The process of claim 1 wherein the two materials are fluids.

3. The process of claim 2 wherein one material is substantially in the gaseous phase and the other material is substantially in the liquid phase.

4. The process of claim 1 wherein the two materials are liquids.

5. The process of claim 1 wherein the outputs are electric signals from a time domain reflectometer, which outputs are proportional to the impedance of the sensors.

6. The process of claim 5 wherein the impedance of each sensor is dependent on the length of each sensor and the dielectric constant of the material in which each sensor is disposed.

7. The process of claim 1 wherein the sensed property is the dielectric constant of the material.

8. The process of claim 1 wherein the sensed property is the resistivity of the material.

9. The process of claim 1 wherein the sensed property is the temperature of the material.

10. The process of claim 1 wherein the output of the first sensor is $le_1$, the output of the second sensor is $le_2$ and the output of the third sensor is $e_3 l_3 + e'_3 l'_3$ where $e_1$ is the output per unit length of the first sensor in the first material $e_2$ is the output per unit length of the second sensor in the second material $e_3$ is the output per unit length of the portion of the third sensor in the first material $e'_3$ is the output per unit length of the portion of the third sensor in the second material $l$ is the length of sensors one and two $l_3$ is the length of the portion of the third sensor in the first material $l'_3$ is the length of the portion of the third sensor in the second material and where the operations on the individual outputs are combined within the adaptive detector in accordance with the following relation to give the total output $e_c$ indicative of the interface level:

$$e_c = A/l(e_2 - e_1)[e_3 l_3 + e'_3 l'3 - e_1 l] + B$$

where $A$ represents the span of the output of each sensor proportional to the length $l$, and $B$ represents an offset term equivalent to the lowest possible output value from which span A is measured.

11. The process of claim 10 wherein the three sensors are the same length.

12. The process of claim 10 wherein the three sensors are coaxial capacitance sensors.

13. The process of claim 10 wherein the sensors are twin-lead probe sensors.

14. An apparatus for determining interface change between adjacent materials comprising:
   a container containing the adjacent materials whose points of contact define an interface between the materials;
   a first sensor disposed within one of the adjacent materials;
   a second sensor disposed within the other adjacent material;
   a third sensor disposed within both adjacent materials and spanning the interface;

means for transmitting to an adaptive detector an output signal from the first sensor proportional to the length of the first sensor and the sensed property of the material in contact with the first sensor;

means for transmitting to the adaptive detector an output signal from the second sensor proportional to the length of the second sensor and the sensed property of the material in contact with the second sensor;

means for transmitting to the adaptive detector an output signal from the third sensor proportional to the portions of the length of the third sensor and the sensed property of the first and second materials in contact with the respective portions;

the adaptive detector combining each of the sensor outputs in accordance with the formula:

$$e_c = A \left( \frac{\text{output from the third sensor-output from the first sensor}}{\text{output from the second sensor-output from the first sensor}} \right) + B$$

wherein $e_c$ is the combined output, $A$ is a constant proportional to the span of each output, and $B$ represents an offset term equivalent to the lowest output value from which span $A$ is measured.

15. The apparatus of claim 14 wherein the sensed property is the dielectric constant of the material.

16. A process for detecting change in position of an interface defined by two adjacent different materials in a container comprising:

a. introducing a first sensor of a certain length into the first material, the sensor having an electrical output proportional to the velocity of sound of the material and the length of the sensor; the output is transmitted to an adaptive detector, b. introducing a second sensor of a certain length into the second material, the second sensor having an electrical output proportional to the velocity of sound of the material and the length of the sensor; the output is transmitted to the adaptive detector, c. introducing a third sensor of a certain length into the region of the interface so that portions of the third sensor are in each of the two materials, the electrical output of the third sensor is proportional to the product of the length of the third sensor in the first material and the velocity of sound of the first material in summation with the product of the length of the third sensor in the second material and the velocity of sound of the second material; the output of the third sensor is transmitted to the adaptive detector, d. combining each of the sensor outputs in the adaptive detector in accordance with the formula:

$$e_c = A \left( \frac{\text{output from the third sensor-output from the first sensor}}{\text{output from the second sensor-output from the first sensor}} \right) + B$$

wherein $e_c$ is the output of the adaptive detector, $A$ is a constant proportional to the span of each sensor output, and $B$ represents an offset term equivalent to the lowest output value from which the span $A$ is measured.

17. A process for detecting change in position of an interface defined by two adjacent different materials in a container comprising:

a. introducing a first sensor of a certain length into the first material, the sensor having an electrical output proportional to the density of the material and the length of the sensor; the output is transmitted to an adaptive detector, b. introducing a second sensor of a certain length into the second material, the second sensor having an electrical output proportional to the density of the material and the length of the sensor; the output is transmitted to the adaptive detector, c. introducing a third sensor of a certain length into the region of the interface so that portions of the third sensor are in each of the two materials, the electrical output of the third sensor is proportional to the product of the length of the third sensor in the first material and the density of the first material in summation with the product of the length of the third sensor in the second material and the density of the second material; the output of the third sensor is transmitted to the adaptive detector, d. combining each of the sensor outputs in the adaptive detector in accordance with the formula:

$$e_c = A \left( \frac{\text{output from the third sensor-output from the first sensor}}{\text{output from the second sensor-output from the first sensor}} \right)$$

wherein $e_c$ is the output of the adaptive detector and $A$ is a constant proportional to the span of each sensor output.

* * * * *

PO-1050
(5/69)

UNITED STATES PATENT OFFICE
CERTIFICATE OF CORRECTION

Patent No.  3,695,108            Dated  October 3, 1972

Inventor(s)          Noel D. Wygant

It is certified that error appears in the above-identified patent and that said Letters Patent are hereby corrected as shown below:

Col. 3, line 50:    Delete "$e_6 e_6$" and insert $--e_6 \ell_6--$

Col. 5, line 3:    After "4" insert -- ± --.

Col. 5, line 5:    Delete "$\ell$" and insert --1--.

Col. 6, line 24:    Delete "3" and insert --$_3$-- (subscript).

Signed and sealed this 6th day of February 1973.

(SEAL)
Attest:

EDWARD M. FLETCHER, JR.
Attesting Officer

ROBERT GOTTSCHALK
Commissioner of Patents